United States Patent
Demos

(10) Patent No.: US 9,659,205 B2
(45) Date of Patent: May 23, 2017

(54) MULTIMODAL IMAGING SYSTEM AND METHOD FOR NON-CONTACT IDENTIFICATION OF MULTIPLE BIOMETRIC TRAITS

(71) Applicant: Lawrence Livermore National Security, LLC, Livermore, CA (US)

(72) Inventor: Stavros Demos, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 376 days.

(21) Appl. No.: 14/299,867

(22) Filed: Jun. 9, 2014

(65) Prior Publication Data
US 2015/0356339 A1   Dec. 10, 2015

(51) Int. Cl.
*G06K 9/00* (2006.01)
*H04N 7/18* (2006.01)
(Continued)

(52) U.S. Cl.
CPC ..... *G06K 9/00013* (2013.01); *G06K 9/00885* (2013.01); *G06K 9/00892* (2013.01);
(Continued)

(58) Field of Classification Search
CPC .......... G06K 9/00013; G06K 9/00892; G06K 9/2018; G06K 9/00885; G06K 2009/00932; H04N 5/2354; H04N 7/18; A61B 1/041; A61B 1/00036; A61B 1/0005; A61B 19/52
See application file for complete search history.

(56) References Cited

U.S. PATENT DOCUMENTS 5,929,443 A   7/1999   Alfano et al.
6,032,070 A   2/2000   Flock et al.
(Continued)

FOREIGN PATENT DOCUMENTS

JP   2012164357   8/2012
WO   2006073450 A2   7/2006

OTHER PUBLICATIONS

International Search Report and Written Opinion of corresponding International Application No. PCT/US2015/034965, mailed Sep. 22, 2015, 19 pages.

*Primary Examiner* — Sath V Perungavoor
*Assistant Examiner* — Howard D Brown, Jr.
(74) *Attorney, Agent, or Firm* — Harness, Dickey & Pierce PLC

(57) ABSTRACT

Systems and methods are disclosed for obtaining at least a pair of biometric traits of a person and without contact with the person. In one embodiment a system is disclosed which makes use of a plurality of illumination modules and an imaging module, where a single image is acquired with a color encoded imaging sensor. Parallel and orthogonally polarized images are obtained by at least one sensor of the imaging module from illuminations produced by the illumination modules. A processing subsystem uses mathematical applied operations between the acquired images to selectively produce at least one image of at least one specific biometric trait, such as a finger print, a palm print, a finger-vein, a palm vein, or hand geometry. The biometric trait can be subsequently used for biometric verification and identification.

19 Claims, 12 Drawing Sheets

(51) Int. Cl.
*H04N 5/235* (2006.01)
*G06K 9/20* (2006.01)

(52) U.S. Cl.
CPC ......... *G06K 9/2018* (2013.01); *H04N 5/2354* (2013.01); *H04N 7/18* (2013.01); *G06K 2009/00932* (2013.01)

(56) References Cited

U.S. PATENT DOCUMENTS

| | | | |
|---|---|---|---|
| 7,174,036 B2 | 2/2007 | Ohba | |
| 7,289,211 B1 | 10/2007 | Walsh, Jr. et al. | |
| 7,347,365 B2 * | 3/2008 | Rowe | A61B 5/0059 235/382 |
| 7,792,337 B2 | 9/2010 | Higuchi | |
| 7,831,072 B2 | 11/2010 | Rowe | |
| 8,300,903 B2 | 10/2012 | Higuchi | |
| 8,661,516 B2 * | 2/2014 | Yamada | G06K 9/00006 382/115 |
| 8,719,584 B2 | 5/2014 | Mullin | |
| 8,887,259 B1 * | 11/2014 | Harding | G06F 21/32 713/185 |
| 2002/0016533 A1 | 2/2002 | Marchitto et al. | |
| 2007/0207681 A1 | 9/2007 | Zabroda et al. | |
| 2008/0049982 A1 | 2/2008 | Nagasaka et al. | |
| 2009/0137908 A1 | 5/2009 | Patwardhan | |
| 2011/0064282 A1 | 3/2011 | Abramovich et al. | |
| 2011/0085708 A1 * | 4/2011 | Martin | G06K 9/00033 382/115 |
| 2011/0129128 A1 * | 6/2011 | Makimoto | G06K 9/00013 382/124 |
| 2011/0150304 A1 * | 6/2011 | Abe | A61B 5/1172 382/124 |
| 2012/0102332 A1 | 4/2012 | Mullin | |
| 2012/0250954 A1 * | 10/2012 | Nada | G06K 9/00087 382/124 |
| 2014/0310786 A1 * | 10/2014 | Harding | H04L 63/0861 726/5 |

* cited by examiner

MULTIMODAL IMAGING SYSTEM AND METHOD FOR NON-CONTACT IDENTIFICATION OF MULTIPLE BIOMETRIC TRAITS

FIELD

The present disclosure relates to systems and methods for obtaining images of biometric traits, and more particularly to systems and methods for the non-contact and simultaneous acquisition and registration of images of multiple biometric traits such as fingerprints, finger-veins, palm prints, palm-veins, overall hand geometry, retina patterns and iris patterns.

BACKGROUND

The statements in this section merely provide background information related to the present disclosure and may not constitute prior art.

Biometric identification represent an objective measurement of one or more distinguishing biological traits (biometric characteristic) of an individual which can be stored in a database to enable comparison with other entries in the database for unique identification and verification of an individual. The most traditional form of biometric verification is fingerprinting. However, other biometric traits such as facial or other bodily characteristics (hand geometry, earlobe geometry, finger-vein, palm-vein, retina and iris patterns) have been used for biometric identification/verification purposes. Still further biometric traits that have been used are the spectral characteristics of a human voice, odor, and dental records. Even DNA and other physiological features/characteristics have been used to date in connection with biometric verification systems.

The digitizing of the information using computers has revolutionized the use of biometric technologies. Such digitizing of information has enabled automated operation of biometric verification systems, and is expected to become a major factor in the future, in part because of the ability to be easily integrated in various common tasks. A digitized biometric characteristic can be acquired rapidly, transmitted and stored in one or more databases, and then compared against information in various other one or more databases.

Independent of the biometric methodology used, the identification verification process initially requires a record of a person's unique characteristic is captured and stored in a database. When identification verification is required, a new record is captured and compared with the previous record in the database.

A biometric system can be either an "identification" system (e.g., to determine a person's identity) or a "verification" system (e.g., to verify a person's identity). The verification process requires capturing of raw biometric by a sensing device. This raw biometric is subsequently processed to extract the distinguishing biometric information, for example a fingerprint, from the raw biometric sample (i.e., image), and to convert it into a processed biometric identifier record. The record may typically be referred to as "biometric sample" or biometric "template." This is typically an encrypted mathematical representation of the original information or a representation of a subset of the characteristics after application of selective criteria. The biometric template may then be registered in a suitable storage medium for future use in making a comparison during an authentication request. For commercial applications, the original biometric information cannot be reconstructed from the stored/registered biometric template.

The biometric information preferably should satisfy a number of characteristics: 1) all individuals (with possibly limited exemptions) can present it; 2) the biometric information should be stable, and thus should not change with time and physiological condition; 3) it should be readily measurable, meaning acquisition of the information should be fast and straightforward; 4) the information should be distinctive or unique to each individual; 5) the information should be transformable, meaning that it should be capable of being reduced to a file that cannot be used for reconstruction of the original information; 6) the information should be digitally comparable to information from others; and 7) the information should be reliable, as well as difficult to imitate by an unauthorized individual and tamper resistant. Various other characteristics are also desirable for any system/method that hopes to obtain acceptance by the general public. Such characteristics/traits may extend to the satisfaction of privacy laws and generally accepted ethical codes and present day ethical norms.

The processing of the information of the recorded raw biometric trait to obtain the biometric template can be limited by the quality of the raw information obtained. For example, the fingerprint pattern (ridges and bifurcations of the finger) can be recorded using light, heat-emission or pressure analysis sensors. Common problems such as contamination, weathering and misuse of the sensor can modify locally the raw information, which will likely affect, at least somewhat, the quality of the identification process. When the biometric template is compared to the stored biometric templates, a matching numeric score is generated to confirm or deny the identity of the user. The threshold numeric score can be selected based on the desired level of accuracy for the system, as measured by the False Acceptance Rate and False Rejection Rate. It is apparent that one would want to minimize false rates. However, if the quality of the recorded raw biometric trait is not sufficient, the generated score will be lower which may lead to false readings.

It should be apparent that the accuracy of a biometric system is directly related to the instrumentation and method used to acquire the raw biometric trait. In addition, each characteristic trait used for identification can provide a varying degree of accuracy in conjunction with the possible method used for recording the raw biometric trait. To improve the overall decision accuracy, more than one biometric trait can be recorded and used for identification. Such systems are typically referred to as "multimodal biometric systems." An additional benefit of using multimodal systems is that such systems have an inherent resistance to being fooled by fraudulent data sources, such as imitation fingers, to obtain unauthorized access. There have been a number of disclosures of such systems. One specific example of an existing multimodal system incorporates the simultaneous utilization of a fingerprint and a finger-vein and/or palm-vein pattern. It is the understanding of the co-inventors of the present disclosure that all fingerprint, finger-vein and palm-vein identification system disclosed up to the present time require complete or partial contact of the finger or palm with the sensor of the biometric system. The need to have contact with the system presents, among other practical issues, potential health concerns (such as unintended or intended origination of infection) as well as contamination of the sensor as discussed previously. It would be clearly highly preferred by both users and system operators if the biometric identification process could be performed by non-contact means. The innovations of the present disclosure are focused around meeting this challenge with new systems and methods that do not require physical contact of a body part of an individual with the sensor element of a biometric system and also provide higher accuracy and resistance to spoofing.

SUMMARY

In one aspect the present disclosure relates to a system for identifying at least a pair of biometric traits associated with a body part of a person without contact with the body part. In one example the system may comprise a first illumination source configured to provide a first illumination at a first wavelength, and having a first polarization. A second illumination source may be used to provide a second illumination at a second wavelength, with a second polarization. A third illumination source may be used which is configured to provide a near infrared (NIR) illumination, while having the second polarization. An imaging subsystem may be used which includes a sensor system for capturing a plurality of acquired images. Each one of the acquired images may be specific to one of the illumination sources and each polarization state, as the illumination sources illuminate the body part. A processing subsystem may be included which is configured to mathematically use at least two different acquired images to generate at least one new image. The new image is associated with at least one of a surface biometric trait of the body part or a subsurface biometric trait of the human body part.

In another aspect the present disclosure relates to a system for obtaining at least a pair of biometric traits associated with a body part of a person, from a single acquired image, and without contact with the body part. The system may comprise a first illumination source configured to provide a first illumination at a first wavelength, and having a first polarization. A second illumination source may be used to provide a second illumination at a second wavelength, with a second polarization. A third illumination source may be configured to provide a near infrared (NIR) illumination, and with the second polarization. An imaging subsystem may be incorporated which includes a color sensor system including groups of red, blue and green pixels for capturing a plurality of acquired images. Each one of the acquired images may be specific to one of the illumination sources and each polarization state, as the illumination sources illuminate the body part. A processing subsystem is configured to mathematically process the acquired images and to use acquired images captured by at least two different groups of the pixels to generate new images that are associated with both a surface biometric trait of the body part and a subsurface biometric trait of the body part.

In still another aspect the present disclosure relates to a method for identifying at least a pair of biometric traits associated with a body part of a person without contact with the body part. In one implementation the method may involve using a first illumination source to illuminate the body part with a first illumination at a first wavelength, and with a first polarization. A second illumination source may be used to illuminate the body part with a second illumination at a second wavelength, and with a second polarization. A third illumination source may be used to illuminate the body part with a near infrared (NIR) illumination which also has the second polarization. A plurality of acquired images may be obtained as the illumination sources illuminate the body part. Each one of the acquired images may be specific to one of the illumination sources and each polarization state. At least two different acquired images may be used to mathematically generate at least one new image. The new image may be associated with at least one of a surface biometric trait of the body part or a subsurface biometric trait of the body part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings.

DETAILED DESCRIPTION

Figure 1:
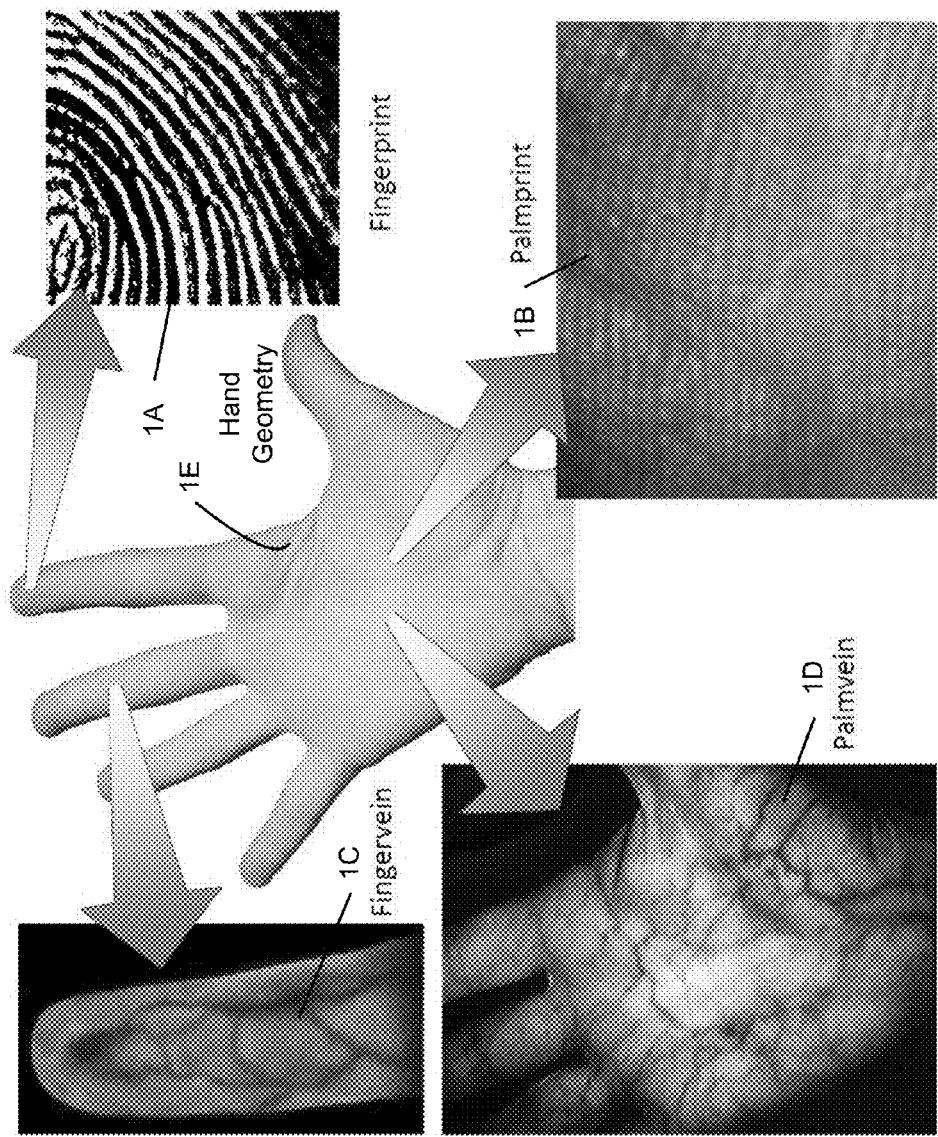
FIG. 1 is an illustration of a human hand showing enlargements of four biometric features or traits of the hand, those being the fingerprint, the palm print, the finger-vein the palm-vein, and palm or hand geometry, which may be used as biometric traits by the present disclosure in identifying an individual.

The following description is merely exemplary in nature and is not intended to limit the present disclosure, application, or uses. It should be understood that throughout the drawings, corresponding reference numerals indicate like or corresponding parts and features.

Overview of Pertinent Technology

The background technology that the present disclosure extends upon is described in U.S. Pat. No. 5,929,443 and related work that has been published in the scientific literature. Several basic principles discussed in U.S. Pat. No. 5,929,443 that are incorporated in the present disclosure can be summarized as follows. Initially, polarized light injected into tissue remains partially polarized after entering the tissue. This enables the use of polarization imaging techniques under near infrared illumination to enhance visualization of structures located below the skin layer (sub-dermal structures). The image under polarized illumination can be separated into the polarized and unpolarized components. The unpolarized image component is equally distributed between the two polarization image components, but the polarized component is present only in the parallel polarization image component. Isolating the polarized image component, such as via subtraction of the parallel from the perpendicular image components, results in the image of the surface structures of the tissue (such as the fingerprint) being enhanced. Using the unpolarized image component, the visibility of sub-dermal structures is enhanced. Inter-image operations between unpolarized images acquired at different wavelengths can enhance the visibility of objects located at different depth zones, thus providing depth profiling and/or enhancement of the visualization of the subsurface structures.

Example Embodiments

The human hand contains features that has been known for decades (or longer) to provide unique identification information in humans. FIG. 1 displays characteristic examples for the case of the human palm. The human palm contains biometric information that has been widely used for identification including the fingerprint 1A, which is the most well known and utilized biometric characteristic, the palm print 1B, the finger-vein pattern 1C, the palm-vein pattern 1D, and the overall palm and/or hand geometry 1E. Various ones of these biometric traits have been used in various biometric systems presently on the market.

The present disclosure teaches systems and methods for non-contact, simultaneous acquisition and registration of multiple biometric signatures. Systems that make use of multiple biometric signatures are often referred to as "multimodal" biometric systems. In one specific implementation, the teachings of the present disclosure may be used to simultaneously analyze and acquire all five of the biometric traits 1A-1E illustrated in FIG. 1. This provides a number of significant benefits such as significantly improved accuracy. Another benefit is that if one biometric trait is missing in a person either permanently of temporarily (such as from injury), the other biometric traits associated with the individual can still be used. The systems and methods of the present disclosure can use existing databases that contain information from specific biometric traits (such as the fingerprint or palm-vein), thus enabling integration with existing databases that can be subsequently enhanced via registration of the additional biometric traits. The present disclosure also provides a distinctive and highly desirable non-contact solution: the human hand is remotely examined without any physical contact of the hand or its digits with any sensor component of the system or its peripherals.

Figure 2:
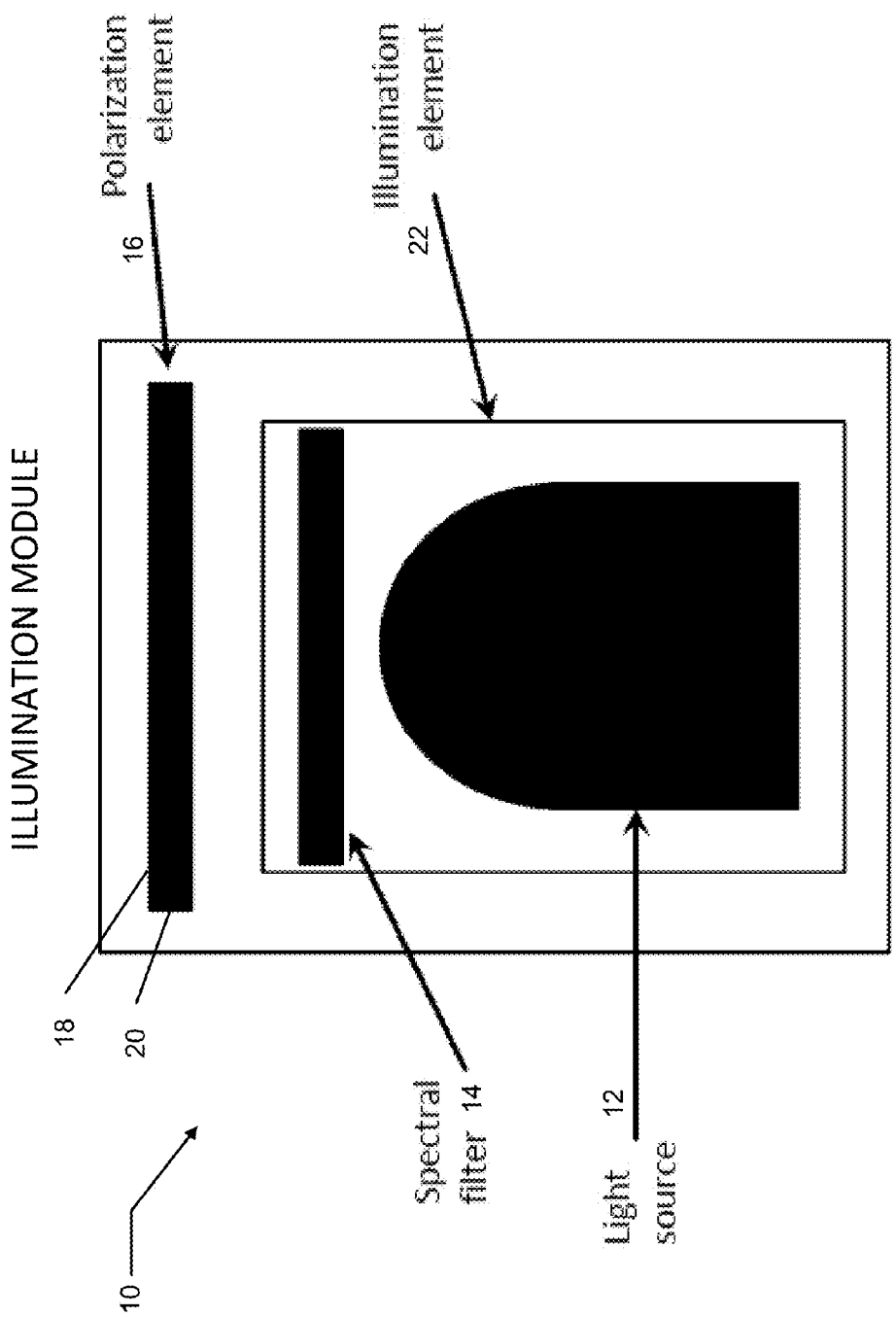
FIG. 2 is a high level diagram of one example of an illumination module which may be used with an imaging system of the present disclosure.

The systems and methods of the present disclosure can be implemented in a plurality of cost efficient designs. One specific embodiment of an imaging system of the present disclosure that performs the acquisition of the various biometric characteristics contains illumination modules that provide relatively narrowband-polarized illumination. The schematic shown in FIG. 2 describes in general terms one such illumination module 10. The illumination module 10 contains a light source 12, such as an LED, OLED or other compact light emitting or delivering device. In addition, a spectral filter 14 may be used to provide purification or modulation of the spectral content of the light source delivered to the target.

The illumination module 10 also includes a polarizing element 16 to select the polarization state of the illumination to be one of the principal polarization states. Such principal polarization state may include the orthogonal polarization states in linearly polarized light, in circularly polarized light or in elliptically polarized light. The polarizing element 16 may contain a linear polarizer 18 and a combination of waveplates 20, both indicated in FIG. 2 in simplified diagrammatic form. Each illumination module 10 may be integrated with a single device, such as a flat panel display, which provides the specific characteristics of each module, namely, a specific principal polarization state for each relatively narrowband illumination spectral band (wavelength).

Figure 3:
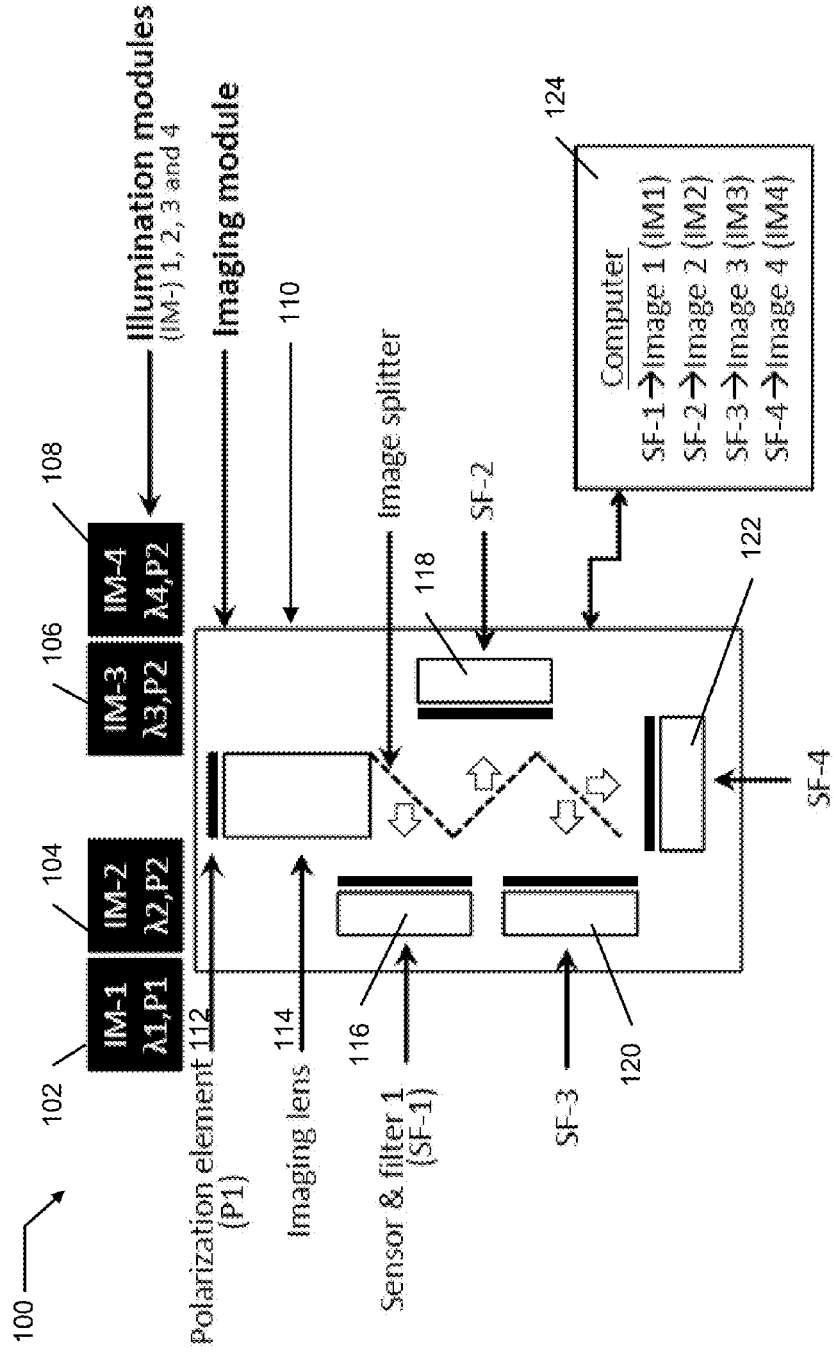
FIG. 3 is a schematic depiction of one example of a multimodal imaging system of the present disclosure for non-contact acquisition of biometric signatures.

FIG. 3 shows a schematic depiction of one example of a multimodal imaging system 100 of the present disclosure for non-contact acquisition of biometric signatures. In this example the system 100 has four illumination sources formed by illumination modules 102(IM-1), 104 (IM-2), 106 (IM-3) and 108 (IM-4), that provide illumination at wavelengths $\lambda 1$, $\lambda 2$, $\lambda 3$ and $\lambda 4$ (or otherwise relatively narrow spectral bands), respectively. Each illumination module 102-108 may be constructed generally in accordance with illumination module 10 of FIG. 2, and has a specific principal polarization state (P1 or P2). Each imaging module 110 also includes a polarization element 112 that selects a principal polarization state (P1) of the light entering into the system 100 for image acquisition. It should be noted that only the polarization state in illumination module 102 is the same as that of the imaging module 110, that being because of the use of polarization element 112 which provides polarization state P1, while the other illumination modules have orthogonal polarization to that of the imaging module 110. A single imaging lens system 114 may be used for the relay of the image of the target area (hand) exposed to the polarized light of the illumination modules 102-108 into a plurality of imaging sensor/filter subsystems 116-122. The light collected by the imaging lens system 114 is separated and each wavelength is directed to different ones of the sensor/filter subsystems 116-122. The sensor/filter subsystems 116-122 each are two dimensional sensors equipped with a spectral filter. Each of the sensor/filter subsystems 116-122 are used to subsequently acquire the image component associated with each illumination wavelength $\lambda 1$, $\lambda 2$, $\lambda 3$ and $\lambda 4$, associated with illumination modules 102-108 (IM-1 through IM-4, respectively,) with a polarization state that is parallel or perpendicular (referring to the principal polarization orientations as defined above) to the polarization of the imaging module depending on the polarization elements 112. Specifically, the image information obtain from the illumination provided by illumination module 102 (IM-1) is the parallel polarization image of IM-1, while the image information obtained from the illumination modules 104-106 (IM-2, IM-3 and IM-4) represents the perpendicular polarization images of the illuminations provided by illumination modules 104-108 (IM-2, IM-3 and IM-4, respectively). The system 100 may use a processing subsystem, in one example a computer 124, to mathematically process the acquired images to produce one or more new images that present the selected biometric traits with a visually enhanced presentation.

Figure 4:
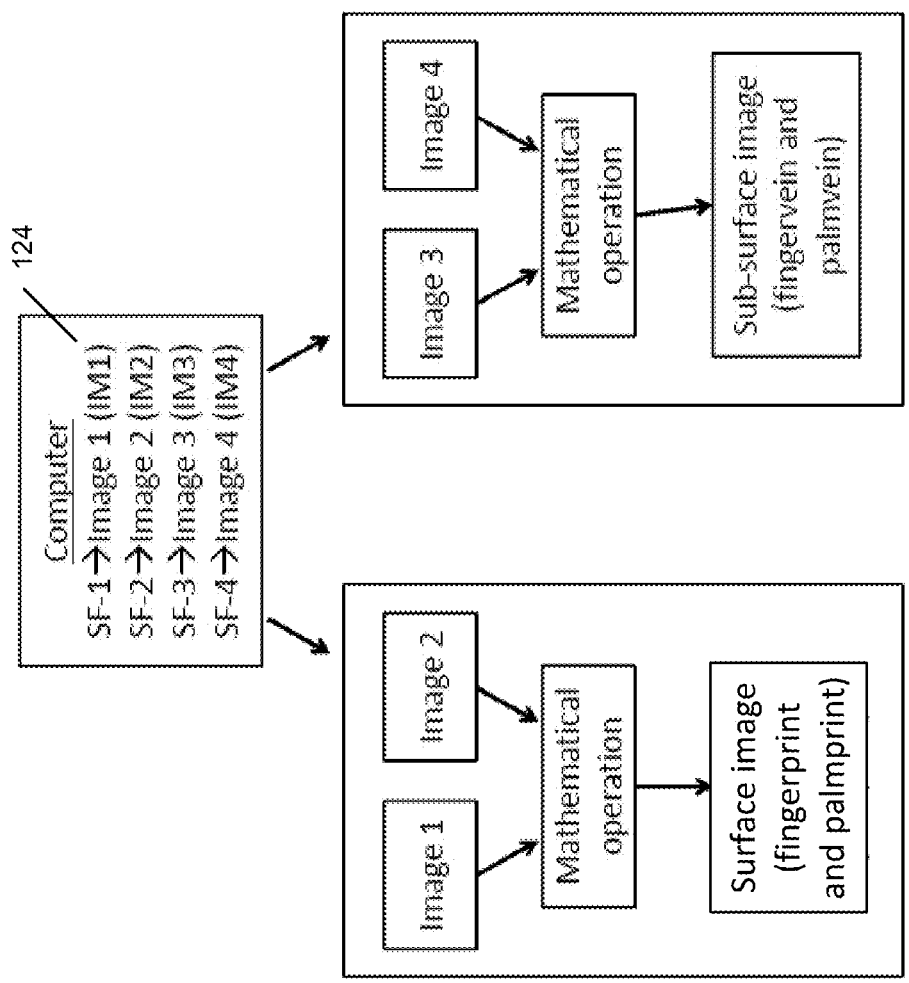
FIG. 4 is a diagrammatic illustration of operations that may be performed by the system using the computer shown in FIG. 3.

FIG. 4 describes the inter-image operations that may be utilized by the computer 124 to extract the surface information images (such as the finger print and palm print) or the subsurface information images (such as the finger-vein and palm-vein). Typically, the following parameters or methods apply but numerous variations can be used. Initially, the polarization of the illumination modules 102-108 is preferably either linear polarization or circular polarization, but of the same type for all modules 102-108 (IM-1 through IM-4). The wavelengths of illumination module 102 (IM-1) and illumination module 104 (IM-2) are the same ($\lambda 1 = \lambda 2$). This wavelength is preferably in the violet, blue or green spectral range. The wavelengths of illumination modules 106 and 108 (IM-3 and IM-4) ($\lambda 3$ and $\lambda 4$) are preferably in the red and/or near infrared spectral range including wavelengths in the 600 to 1750 nm spectral range. The mathematical operation between images corresponding to illumination from module 102 (IM-1) and illumination from module 104 (IM-2) to obtain the finger print and/or palm print image is a subtraction after normalizing (weighting) one image with respect to the other using a predetermined normalization/weighting method. The mathematical operation between images corresponding to illumination from modules 106 and 108 (IM-3 and IM-4) to obtain the finger-vein image and/or the palm-vein image is a subtraction or division after normalizing (weighting) one image with respect to the other using a predetermined normalization/weighting method. The illumination module 108 (IM-4) may be omitted (along with SF-4 and IM-4) and utilize the image produced from module 106 (IM-3) illumination to obtain the finger-vein and/or palm-vein image. All images obtained after inter-image operations described in FIG. 4 can be further digitally enhanced and processed either by the computer 124 or by a different component to obtain the biometric patterns of interest. The image resolution needs to be adequate to resolve the biometric characteristic of interest. For example, an image that contains the entire hand should be at least preferably about 8 megapixels or larger to meet the image resolution requirements for capturing the fingerprint pattern. Sections of the image (such as the palm-vein) can thereafter be digitally reduced in size for faster processing. The lens system is adjusted to present an in-focus image of the hand. The focal range may be large enough to properly image the hand without out-of focus areas. An auto-focus lens may also be used.

Figure 5:
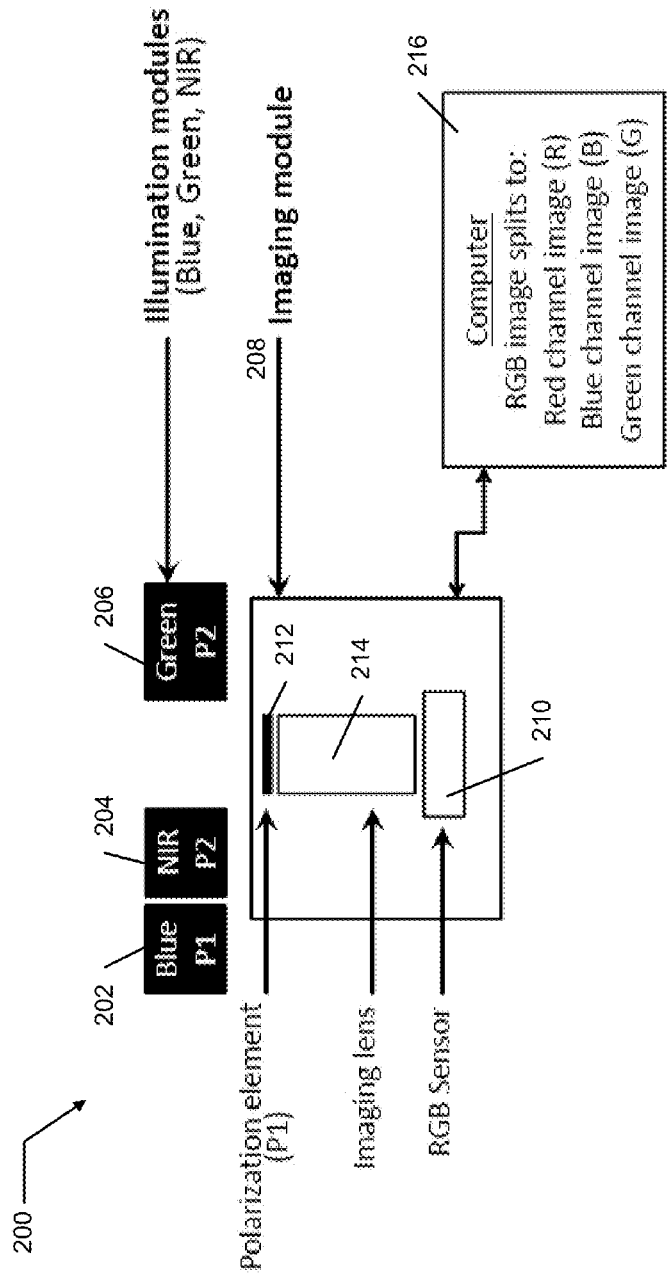
FIG. 5 is a high level diagram of another embodiment of the present disclosure that makes use of three illumination sources, with one of the sources being a NIR illumination source.

FIG. 5 shows one example of a multimodal imaging system 200 for non-contact acquisition of biometric signatures using an imaging subsystem formed by an imaging module 208. The imaging module 208 makes use of a color sensing subsystem, which in this example is a single color RGB sensor 210. In this example illumination modules 202, 204 and 206 provide optical illumination signals in the blue (module 202) spectrum, the NIR spectrum (module 204) and the green spectrum (module 206). Illumination module 202 has polarization P1, while illumination modules 204 and 206 have polarization P2 which is orthogonal to P1. The imaging module 208 includes a polarization element P1 212 (i.e., parallel polarization to illumination module 202) and an imaging lens 214. Such a RGB sensor 210 is designed to separate and record in different sets of pixels the different spectral components of the visible light such as the red, blue and green (RGB) components used for color image recording (video recording or in color photography) in the electronics industry. The RGB sensor 210 effectively obtains a plurality of acquired images which can be analyzed by a processing subsystem, which in this example is a computer 216.

In addition, the sensor RGB sensor 210 should be able to record the near infrared (NIR) image as currently available color sensors (such as CCD and CMOS color image sensors) are also sensitive and capable of recording light in the NIR spectra region. Specifically, the blue color and green color recording pixels of the RGB sensor 210 are also sensitive (capable of recording) photons in about the 800-900 nm spectral region. The red color recording pixels of the RGB sensor 210 are also sensitive in the entire NIR range up to about 900 nm. For this reason, RGB sensors are often equipped with a NIR blocking filter when used in conventional color video or photography applications to allow only the visible light to reach the detector. However, by removing this filter, a conventional RGB color image sensor can also detect the NIR light. The present disclosure takes advantage of this feature to enable acquisition of both visible wavelength and NIR wavelength images using the single RGB sensor 210.

As noted above, the system 200 shown in FIG. 5 incorporates the three illumination sources provided by illumination modules form 202-206. Illumination module 202 operates in the blue region, which is associated with an image that is recorded in the blue color recording pixels of the RGB sensor 210. Illumination module 206 operates in the green region and is associated with an image that is recorded in the green color recording pixels of the RGB sensor 210. Illumination module 204 operates in the NIR region (between about 650 and 900 nm) and is associated with an image that is recorded by all pixels (blue green and red) or only (or mostly) by the red color recording pixels of the RGB sensor 210. Specifically, if the NIR illumination is in approximately the 800-900 nm spectral range, all pixels (blue green and red) of the RGB sensor 210 will record the NIR image with about similar intensity. However, if the NIR illumination is in approximately the 600-800 nm spectral range, the red color recording pixels will record the NIR image as the sensitivity of the blue and green pixels is very small in this range. The single lens 214 is used for the relay of the image of the target area (e.g., hand) exposed to the polarized light from the illumination modules 202-206 and subsequently recorded by the single RGB sensor 210. (there are various types of sensors involving various designs, such as the Bayer filter sensor, the 3CCD sensor and the Foveon x3 sensor).

With further reference to FIG. 5, the polarizing element 212 (P1) is also positioned in front of the imaging lens 214 so that a specific polarization state (referring to the principal polarization orientations as defined above) is recorded by the RGB sensor 210. In addition, the polarization element 212 provides parallel polarization with respect to the polarization of the blue illumination module 202 (P1), and orthogonal polarization with respect to the NIR illumination module 204 and the green illumination module 206.

Figure 6:
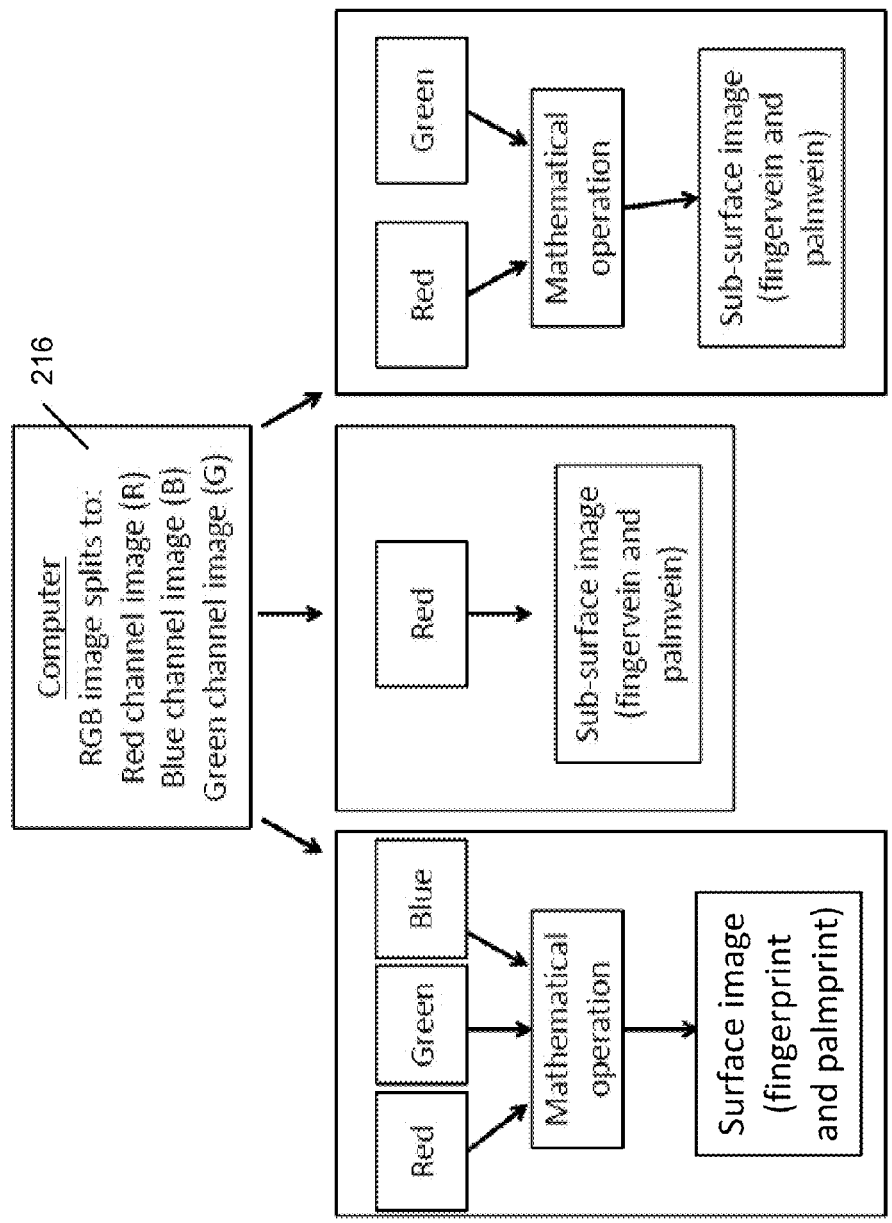
FIG. 6 is a high level diagram of operations performed by the computer of FIG. 5 in obtaining a selected one or more of a finger print, a palm print, a finger-vein and a palm-vein.

FIG. 6 describes the inter-image operations performed by the computer 216 to extract the surface information images (such as the finger print and palm print) or the subsurface information images (such as the finger-vein and palm-vein). This general description provided in FIG. 6 can be further expanded as following. All three pixels sets of the RGB sensor 210, (red, blue and green) capture an orthogonal polarization image of the NIR illumination originating from NIR illumination module 204 (expressed here as NIR[blue], NIR[green] and NIR[red]) and the relative intensity of each image can be measured and is considered as known. Thus:

$$NIR[blue]=k1 \times NIR[red] \text{ and}$$

$$NIR[green]=k2 \times NIR[red]$$

where k1 and k2 are known (measurable) constants.

The red image (R) contains only the orthogonal polarization image of the NIR illumination recorded in the red pixel set, thus:

$$R=NIR[red].$$

The green image (G) contains the orthogonal polarization image component produced from the green illumination module 206 (Gorthogonal) and the orthogonal polarization image of the NIR illumination NIR[green] from NIR illumination module 204, thus:

$$G = Gorthogonal + k2 \times NIR[red] = Gorthogonal + k1 \times R$$

The blue image (B) contains the parallel polarization image component of the blue illumination (Bparallel) and the orthogonal polarization image of the NIR illumination NIR[blue], thus:

$$B = Bparallel + k1 \times NIR[red] = Bparallel + k1 \times R$$

Therefore:

$$Gorthogonal = G - k1 \times R$$

$$Bparallel = B - k1 \times R$$

The red (R), green (G) and blue (B) image components are readily available from the RGB sensor 210, while the parameters k1 and k2 can be determined via simple testing. The testing can be accomplished, for example, by recording the image of an object when only the NIR illumination module 204 is turned on. The orthogonal polarization component of the green and the parallel polarization component of the blue can be extracted via the mathematical image processing described above.

Typically, the following parameters or methods apply but numerous variations can be used. Initially, the polarization of the illumination modules is either linear polarization or circular polarization, but of the same type for all modules. The mathematical operation between the orthogonal polarization component of the green and the parallel polarization component of the blue used to obtain the finger print and/or palm print image is a subtraction or division operation that may be performed by the computer 216. The subtraction or division may be performed after normalizing (weighting) one image with respect to the other using an initial normalization/weighting method. The orthogonal polarization image of the NIR illumination is used to obtain the finger-vein and/or palm-vein image. Alternatively, a mathematical operation between the orthogonal polarization component of the green and the orthogonal polarization image of the NIR illumination may be used by the computer 216 to obtain the finger-vein and/or palm-vein image.

All images obtained after inter-image operations described in FIG. 6 can be further digitally enhanced and/or processed by the computer 216, or an additional enhancement component, to obtain an image of the biometric trait of interest. The image resolution should be adequate to resolve the biometric trait of interest. For example, an image that contains the entire hand should be at least approximately 8 megapixels or larger to meet the image resolution requirements for capturing the finger print pattern. Sections of the image (such as the palm-vein) can be digitally reduced in size for faster processing. The imaging lens system 214 may be adjusted to present an in-focus image of the hand. The focal range may be large enough to properly image the hand without out-of focus areas. An auto-focus lens may also be used.

Figure 7:
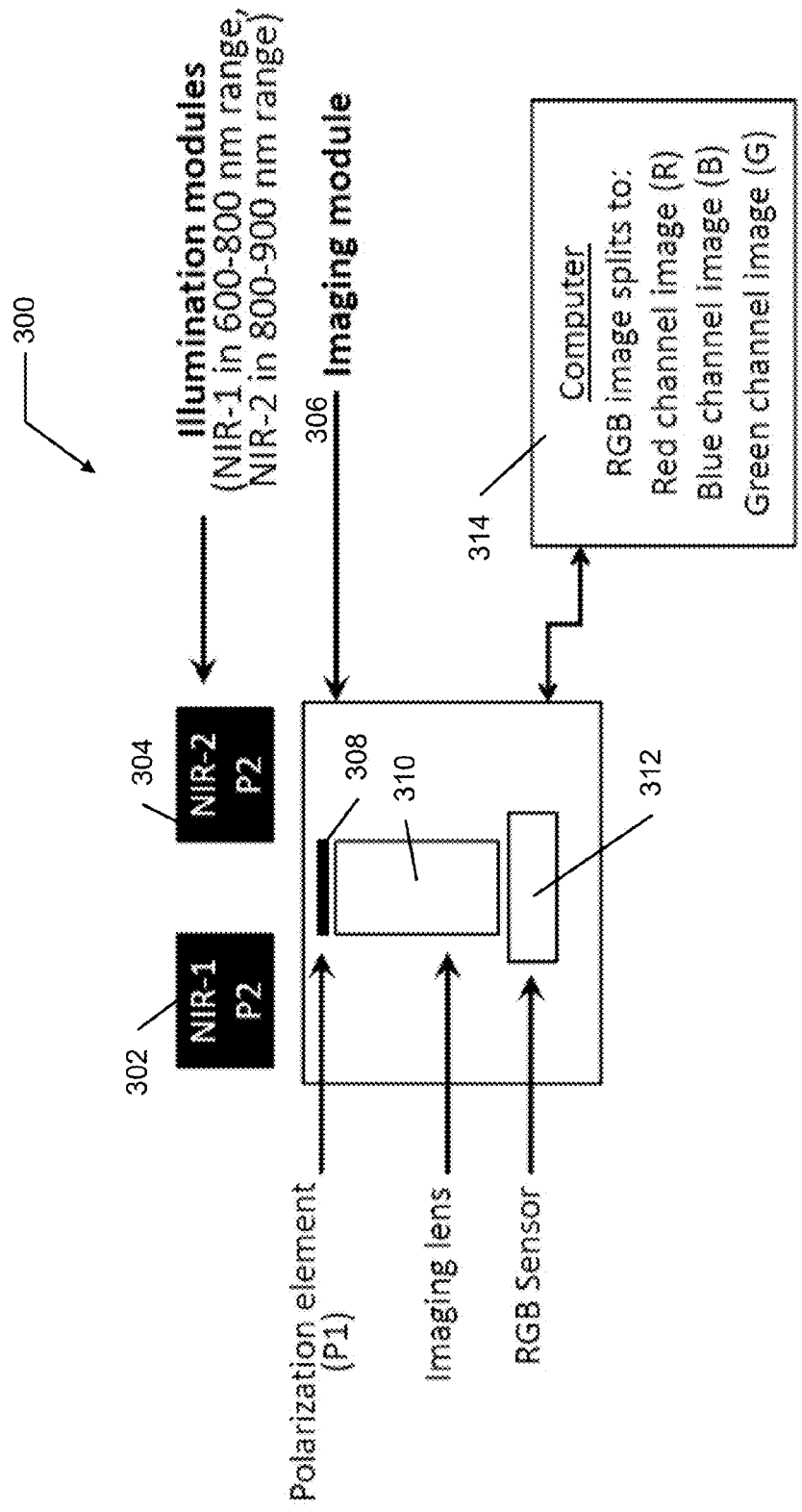
FIG. 7 is a high level diagram of a subsystem that may be used in connection with a system such as shown in FIG. 5, which uses just NIR illumination sources, for example to obtain subsurface biometric traits.

Still another embodiment of the present disclosure is shown in connection with the system 300 in FIG. 7. It will be appreciated immediately that the system 300 of FIG. 7 is preferably intended to be used in connection with, for example, the embodiment of FIG. 5. This can be understood by considering that the use of a single RGB sensor is a way to incorporate the functionality of the system 100 in FIG. 3 using a single color (RGB) sensor. As the color sensor offers the possibility to record three separate images (associated with the blue, green and red color designated pixels) while system 100 in its complete implementation requires acquisition of 4 images, the system 200 of FIG. 5 is designed to emphasize an improved detection of the surface image (by using the blue and green images to obtain the surface image) and use only one image (the NIR image) to record the sub-surface image. The system 300 in FIG. 7 incorporates the use of two NIR wavelengths to obtain an improved detection of the subsurface image. The two systems can be used in combination (using four illumination modules, blue, green, NIR-1 and NIR-2) and the image acquisition process may involve two steps. In the first step, the three illumination sources (blue, green, NIR-1 or NIR-2) of the system 200 of FIG. 5 are turned on and an image is acquired. In the second step, the illumination sources (NIR-1 and NIR-2) of the system 300 of FIG. 7 are turned on and a second RGB image is acquired. The time separation between the two image acquisitions can be very small, for example on the order of 100 milliseconds or less. With this sequential image registration using the embodiments of system 200 and 300, the full functionality and capabilities of the system 100 are recovered.

The system 300 in this example makes use of two illumination sources formed by illumination modules 302 (NIR-1) and 304 (NIR-2), one (module 302) operating in about the 600-800 nm spectra region and the other (module 304) operating in the 800-900 nm spectra region. An imaging subsystem in the form of imaging module 306 is provided which makes use of a polarization element 308, an imaging lens 310 and a RGB sensor 312. The imaging module 306 provides an output to a processing subsystem formed in this example by computer 314. The image from the NIR illumination in the approximately 800-900 nm spectral range is recorded by all pixels (blue, green and red) of the RGB sensor 312 with similar intensities (for reasons discussed earlier). The image from the illumination in the approximately 600-800 nm spectral range (i.e., from NIR illumination module 304) is recorded predominantly by the red pixels of the RGB sensor 312 because the sensitivity of the blue and green pixels is very small in this spectral range.

The single imaging lens 310 may be used for the relay of the image of the target area (e.g., hand) exposed to the polarized light of the illumination modules 302 and 304, and subsequently recorded by the single RGB sensor 312. It will be appreciated that there are various other types of sensors that could be employed in place of an RGB sensor. The polarizing element 308 (P1) is also positioned in front of the imaging lens 310. In addition, the polarization elements of both illumination sources 302 and 304 provide orthogonal polarization (P2) with respect to the polarization of the imaging system 306, which uses polarization P1.

Figure 8:
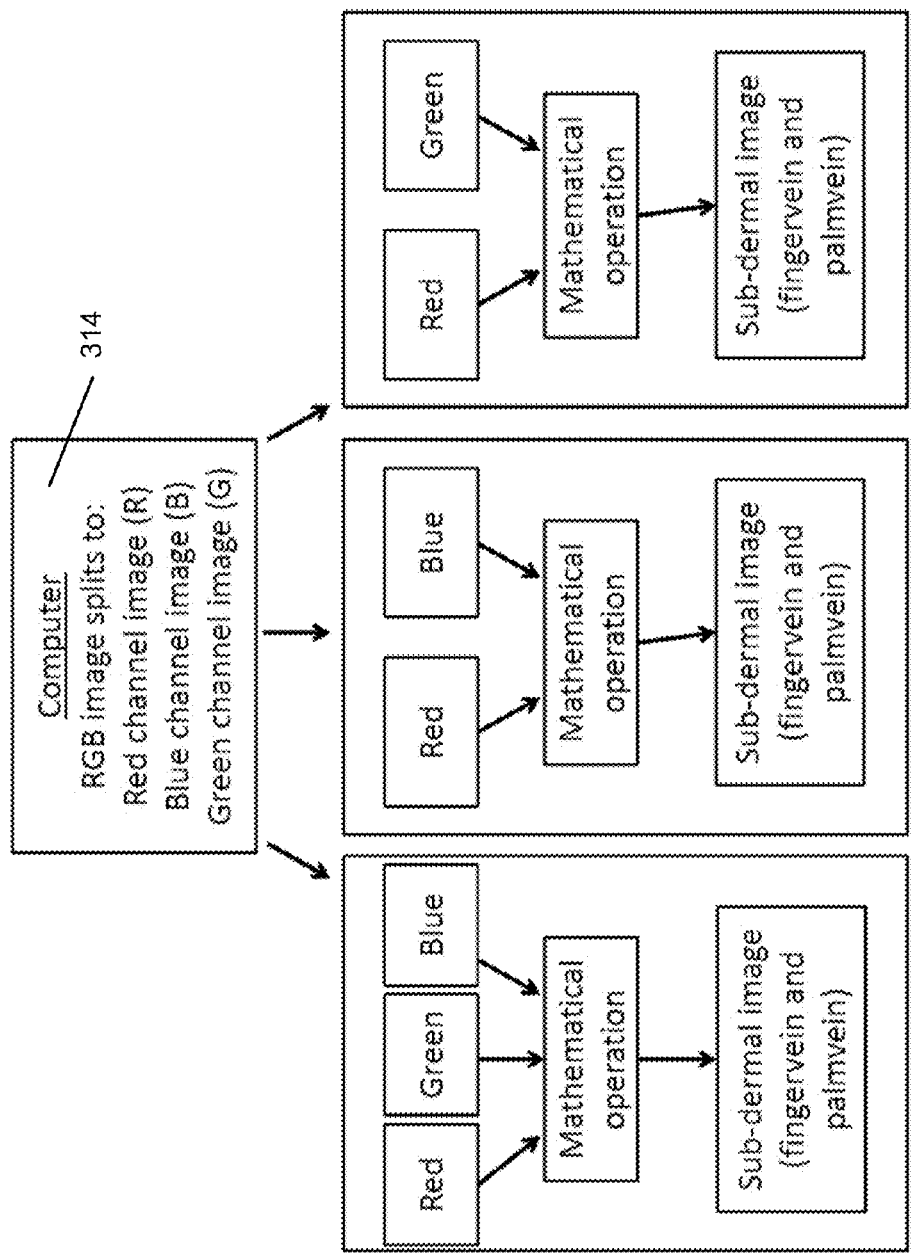
FIG. 8 is a diagram showing operations that may be performed by the computer of the subsystem shown in FIG. 7.

FIG. 8 describes the inter-image operations performed by the computer 314 to extract the subdermal information images (such as the finger-vein and palm-vein). This general description provided in FIG. 8 can be further expanded as follows.

All three pixels sets, (red blue and green) of the RGB sensor 312 capture an orthogonal polarization image of the illumination (expressed here as NIR-2[blue], NIR-2[green] and NIR-1 and NIR-2[red]), and the relative intensity of each image can be measured and is considered as known.

Thus:

$$NIR-2[blue]=c1 \times NIR-2[red] \text{ and}$$

$$NIR-2[green]=c2 \times NIR-2[red]$$

where c1 and c2 are known (measurable) constants.

The green image (G) and blue (B) contains only the orthogonal polarization image of the NIR-2 illumination recorded in the red pixel set of the RGB sensor 312. Thus:

$$B=NIR-2[blue] \text{ and}$$

$$G=NIR-2[green].$$

Thus, the B and G images contain identical information, assuming that the green and blue pixels do not record any photons of the NIR-1 illumination. If there is a leakage, and if some of the NIR-1 illumination module signal can be detected, simple calibration and image processing similar to that described herein can be used to extract the pure NIR-2 image.

The red image (R) contains the orthogonal polarization image component of both illumination wavelengths NIR-1 and NIR-2. Thus:

$$R=NIR-1[red]+NIR-2[red]=NIR-1[red]+B/c1=NIR-1[red]+G/c2$$

Therefore:

$$NIR-1=R-G/c2 \text{ and/or } NIR-1=R-B/c1$$

The R, G and B image components are readily available from the RGB sensor 312, while the parameters c1 and c2 can be determined via simple testing. Testing can be accomplished by recording the image of an object when only the NIR-2 illumination module is turned on. The NIR-1 and NIR-2 image components (i.e., acquired images) can be obtained via inter-image mathematical processing.

Typically, the following parameters or methods apply but numerous variations can be used. The orthogonal polarization acquired images of the NIR-1 and NIR-2 illuminations are used to obtain the finger-vein and/or palm-vein image via a mathematical operation that may include subtraction or division between the acquired images. The subtraction or division may be performed after normalizing (weighting) one image with respect to the other using an initial normalization/weighting method.

All images obtained after inter-image operations described in FIG. 8 can be further digitally enhanced and processed to obtain the image of the biometric trait of interest. The image resolution should be adequate to resolve the biometric trait of interest. The imaging lens 310 may be adjusted to present an in-focus image of the hand. The focal range may be large enough to properly image the hand without out-of focus areas. An auto-focus lens may also be used. The method depicted by FIGS. 7 and 8 can only visualize the sub-dermal veins, although it may be used in conjunction with the method depicted by FIGS. 5 and 6 by using 4 illumination sources.

Figure 9:
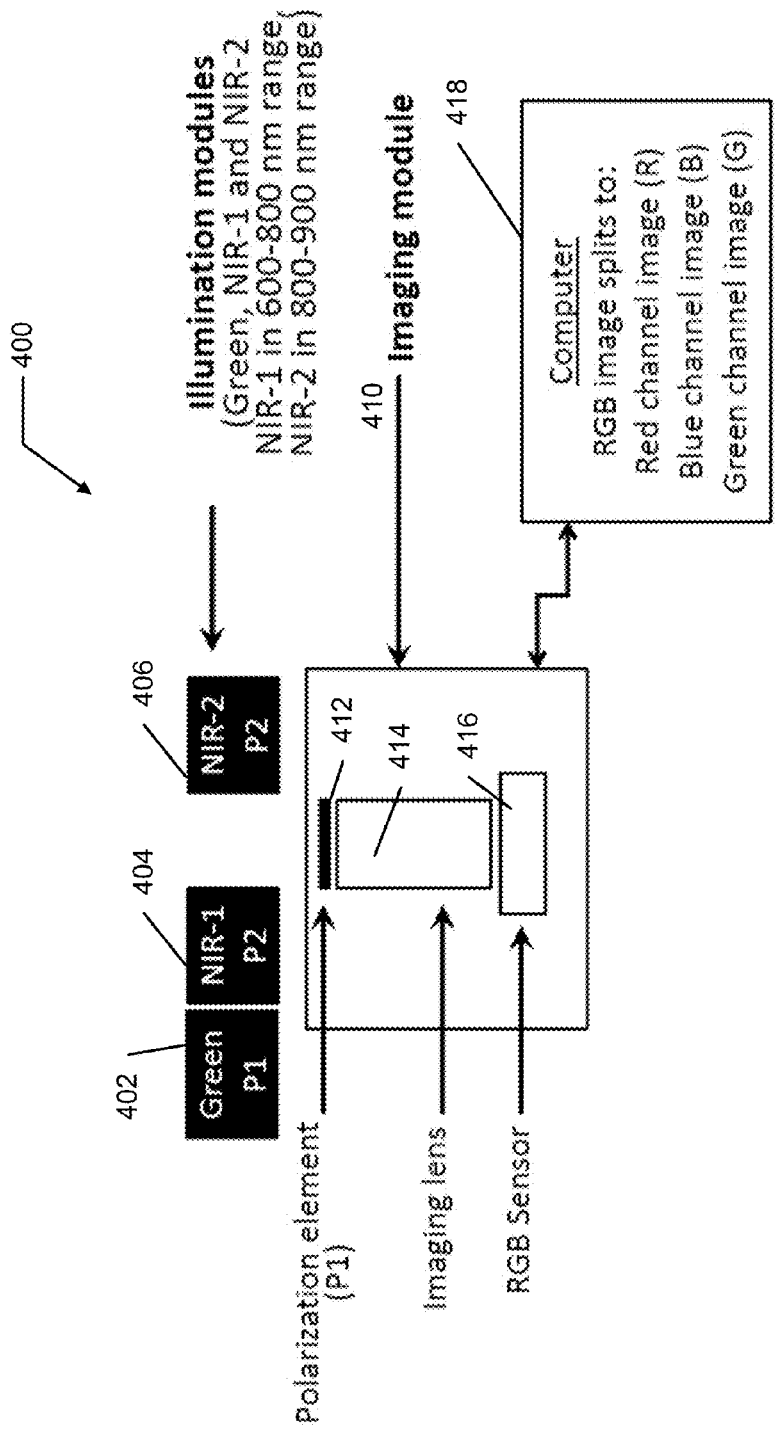
FIG. 9 is a high level diagram of another embodiment of the present disclosure which makes use of one illumination source for providing a green colored illumination, and a pair of NIR illumination sources operating at different wavelengths, which allows information to be captured by a color sensor in each of the red, blue and green spectrums and used for biometric trait detection/verification.
Figure 10:
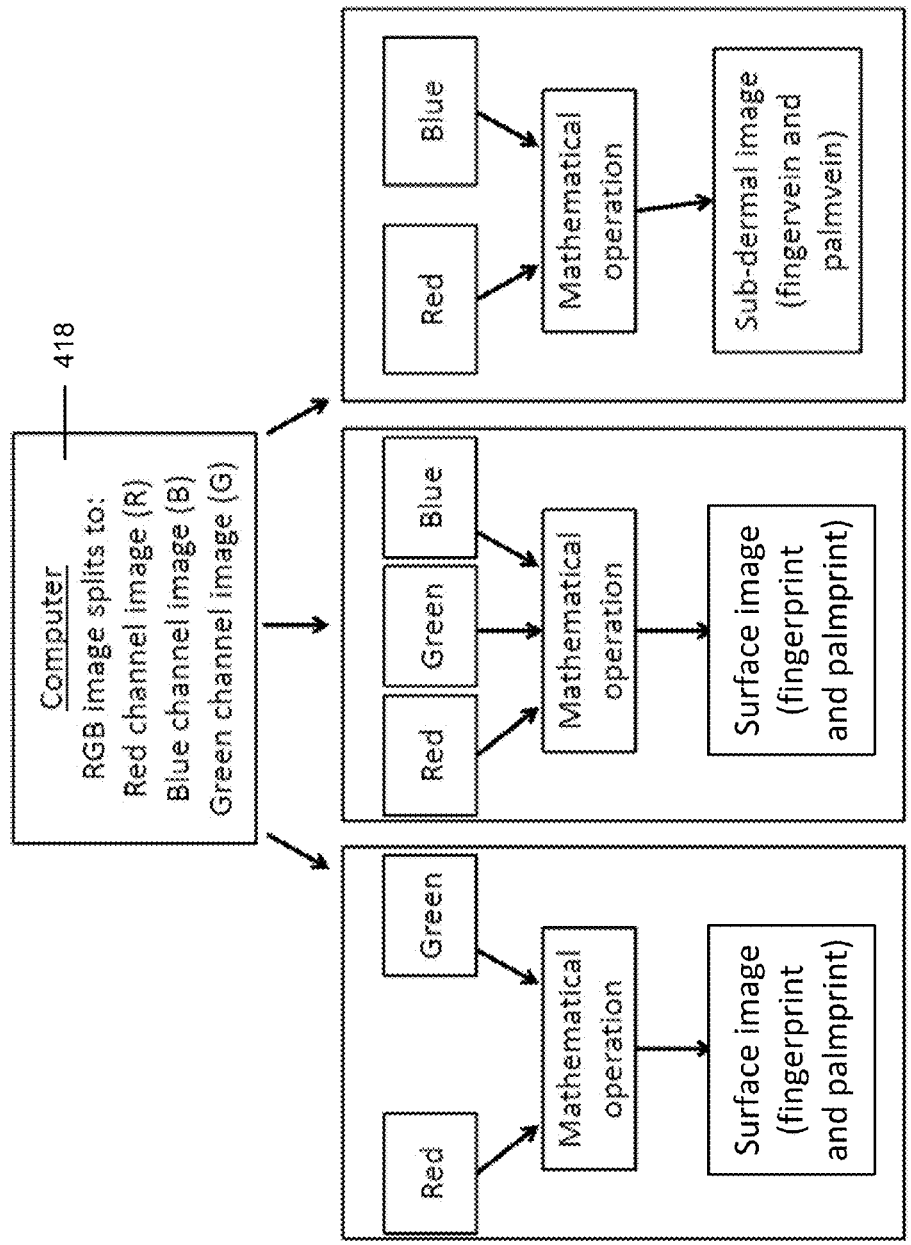
FIG. 10 is a high level diagram showing the operations that the computer of FIG. 9 may perform in obtaining a selected one or more biometric traits.

Referring to FIG. 9, a system 400 incorporating two NIR illumination sources and one non-NIR illumination source is disclosed. This system 400 includes a first illumination source in the form of illumination module 402 for providing illumination at a wavelength to produce green light, a first NIR illumination source in the form of NIR illumination module 404 for producing NIR illumination at a wavelength within the 600 nm-800 nm spectrum, and a second NIR illumination source in the form of NIR illumination module which produces NIR illumination at a wavelength within the 800 nm-900 nm spectrum. The system 400 also makes use of an imaging subsystem in the form of imaging module 410 having a polarization element (P1) 412, an imaging lens 414 and a RGB sensor 416. The output from the imaging lens 414 is provided to a processing subsystem which in one example is a computer 418. The processing of the output from the image sensor 416 can be performed sequentially by the computer 418. The operations performed by the computer 418 are shown in high level form in FIG. 10.

Figure 11:
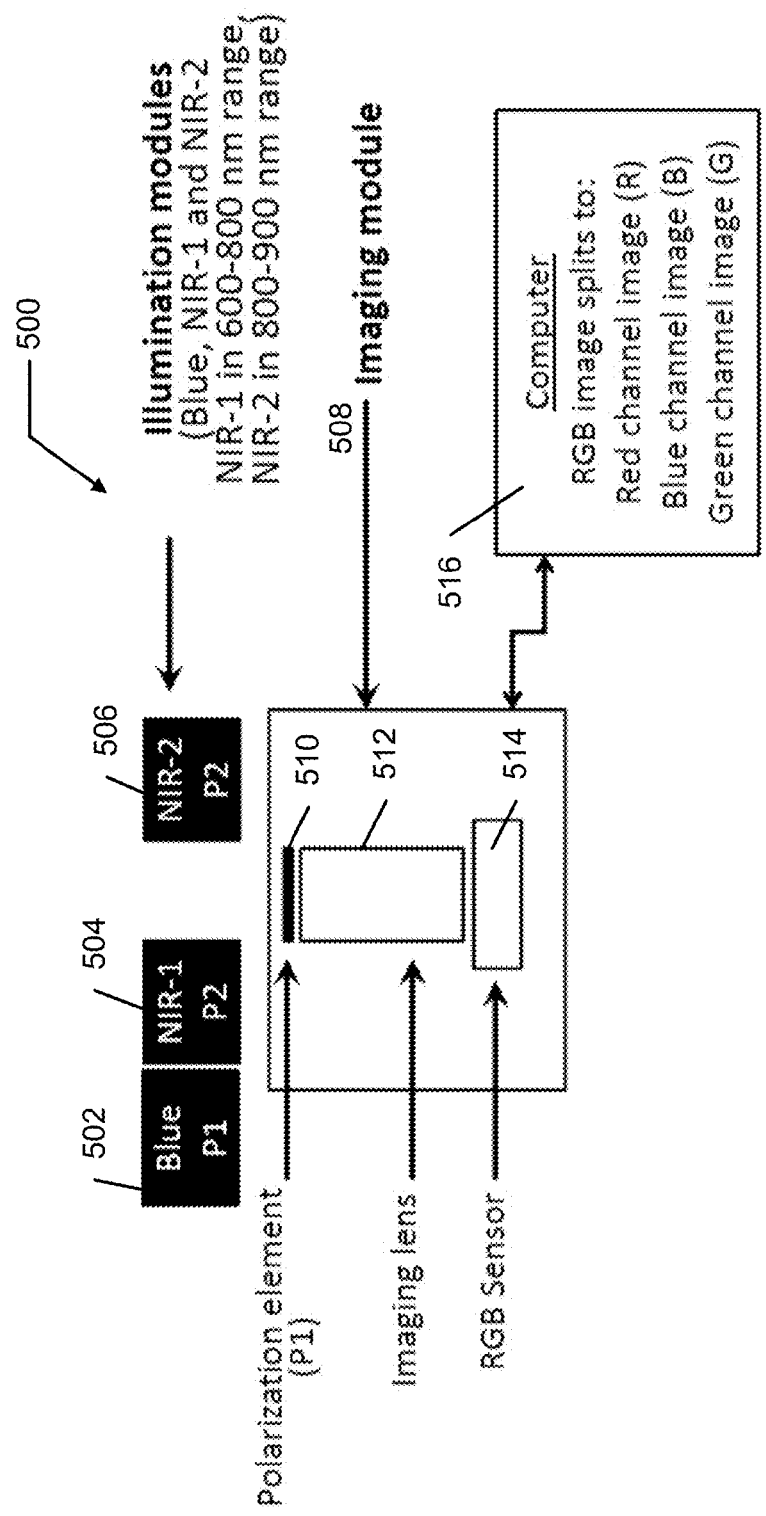
FIG. 11 is a high level diagram showing another embodiment of the present disclosure which makes use of an illumination source that provides an illumination within the blue color spectrum, as well as two NIR illumination sources operating to provide illumination signals at two different NIR wavelengths, which allows information to be captured by a color sensor in each of the red, blue and green spectrums.
Figure 12:
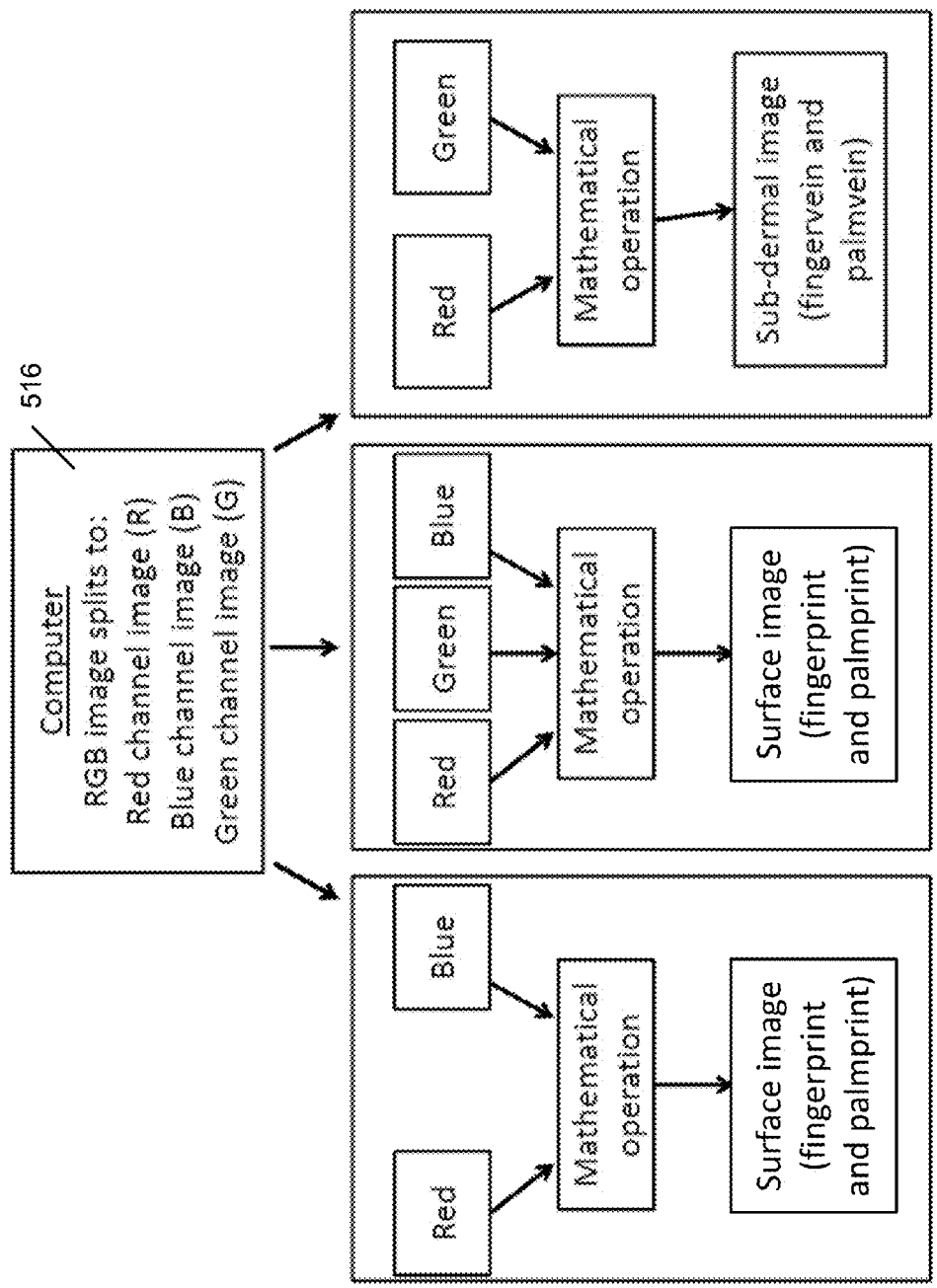
FIG. 12 is a high level diagram showing the operations that the computer of FIG. 11 performs in obtaining selected one or more of the biometric traits.

FIG. 11 illustrates a system 500 in accordance with another embodiment of the present disclosure which makes use of a plurality of illumination sources formed by a first illumination module 502, a first NIR illumination module 504 and a second NIR illumination module 506. The first illumination module may produce an illumination of light within the blue color spectrum with a first polarization (P1), the first NIR illumination module 504 may produce an illumination of light within the 600 nm-800 nm NIR spectrum and with a second (P2) polarization, and the second NIR illumination module 506 may produce an illumination within the 800 nm-900 nm NIR spectrum also with the second polarization (P2). An imaging subsystem in the form of imaging module 508 may include a polarization element (P1), an imaging lens 512 and a sensing subsystem which in one example is an RGB color sensor 514. A processing subsystem, which in one example is a computer 516, may receive the output from the RGB sensor 514 and mathematically split the red (R), blue (B) and green (G) channel images obtained from the RGB sensor 516. It must be noted that system 400 of FIG. 9 and system 500 of FIG. 11 are designed to emphasize an improved detection of the sub-surface image using two NIR modules and a single RGB image acquisition. The rationale for such approach was discussed hereinbefore in connection with the system 300 of FIG. 7.

Upon capturing the image of the biometric trait, an image processing method may be used by the computer 418 or by a different component to generate the biometric template. As mentioned earlier, the methods described in the present disclosure can simultaneously acquire multiple biometric traits such a finger print, a finger-vein, a palm print, a palm-vein, as well as the hand geometry using the palmar side of a human hand. Using the dorsal aspect of a human hand, the dorsal vein pattern as well as the nail and hand geometries can be used as additional information. One can potentially further expand the systems 100-400 to obtain and analyze biometric traits or features for both the left and the right hands. The multiplicity of recorded biometric information can be used in various ways, such as for improved accuracy or for interfacing with multiple databases. However, the systems 100-400 can also be used in some new ways that open new capabilities in the currently known biometric identification toolset. For example, the user (person undergoing identification) can define which biometric trait subset to be used during each biometric identification process. Alternatively, a system administrator can define which biometric subset trait is to be used during each biometric identification process (including random selection).

Still further, new biometric templates can be developed that relate features across different biometric traits. For example, the finger print and finger-vein patterns (or palm print and palm-vein) can be simultaneously considered to define cross correlated features for the extraction of the biometric template. This gives additional layers of information to improve accuracy. In addition, developing templates that compare the features of one biometric trait with those of another, the hand would not be needed to be in a particular fixed geometry with respect to the imaging module, such as the palm surface being parallel to the image plane of the imaging module. The most characteristic aspect of each set of biometric traits can be used for each person, thus using the selected biometric traits that can be most efficiently extracted for each person. This may be one of two or more subsets for each biometric trait, but by combining the different subsets there is sufficient information for the unique identification of a person.

A sequence of biometric raw images can be used using the same system but different methods such as the example discussed earlier and depicted in FIG. 9. There is a number of ways different biometric raw images can be acquired sequentially. It must also be noted that a combination of sequential acquisition of two or more images based on the systems 200, 300, 400 and 500 are potentially advantageous and represents part of the teachings of the present disclosure. While the examples show a single RGB sensor being used, it will be appreciated that more than one sensor may be employed to obtain the acquired images to be used by the computer system for processing purposes.

An image before the illumination sources are turned on can be acquired and can be subtracted from the image recorded after the illumination sources are turned on in order to remove the image information arising from the ambient lighting (background). This may improve the quality of the resulting images capturing the specific biometric traits.

It should be emphasized that the various embodiments of the present disclosure described herein for the acquisition and utilization of multiple biometric traits, when employed for identification purposes, each make it extremely difficult to use a fabricated object(s) to obtain unauthorized access. However, additional elements can be incorporated (built in to) into the various embodiments to enhance the ability of each to detect such fabricated objects. Such an extra layer of protection could be formed by configuring the system to use multiple wavelengths for illumination. As a result, the (normalized) ratio of the intensities of images of different wavelengths represent spectroscopic information of the presence of a human with a specific tissue structure and biochemical composition, for example an amount of melanin and fatty tissue. The various embodiments described herein can further be augmented by incorporating a simple spectroscopy system to analyze the reflected light (preferably the cross polarized component) as a function of wavelength. This will require the addition of a white light source and some type of spectroscopic analysis over a relatively broad spectrum. Methods to detect the presence of blood flow and/or oxygenation similar to that pulse oximetry (but via noncontact means), as well as methods to detect temperature variations, may also be implemented using the systems and teachings of the present disclosure. Other non-invasive and non-contact analytical methods are possible such as Raman scattering and Infrared spectroscopy based methods.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for obtaining images associated with at least a pair of biometric traits associated with a body part of a person, without contact with the body part of the person, the system comprising:
    a first illumination source configured to provide a first illumination at a first wavelength, and having a first polarization;
    a second illumination source to provide a second illumination at a second wavelength, and having a second polarization;
    a third illumination source configured to provide a near infrared (NIR) illumination, and having the second polarization;
    an imaging subsystem including a polarizer having the first polarization and a sensor system for capturing a plurality of acquired images, each one of said plurality of acquired images being specific to one of said illumination sources, as the illumination sources illuminate the body part;
    a processing subsystem configured to mathematically use at least two different ones of said plurality of acquired images associated with at least two of the illumination sources to generate at least one new image providing enhanced contrast of features associated with at least one of a surface biometric trait of the body part and a subsurface biometric trait of the body part; and
    wherein the processing subsystem is configured to at least one of mathematically subtract or divide, after normalization, one of the images from the plurality of acquired images, from a different one of the acquired images, to selectively obtain at least one of the surface biometric trait and the subsurface biometric trait.

2. The system of claim 1, where the plurality of acquired images is acquired by configuring the sensor system with a plurality of sensors, with each said sensor being configured to obtain one of the plurality of acquired images.

3. The system of claim 1, wherein each one of the plurality of acquired images is acquired using a single sensor which obtains sequentially separate ones of the plurality of acquired images.

4. The system of claim 1, wherein the processing subsystem is configured to produce a plurality of new images for enhancing the image contrast of features associated with the surface or subsurface biometric traits of the body part from the plurality of acquired images.

5. The system of claim 1, wherein the biometric traits comprise a plurality of:
    a palm print;
    a finger print;
    hand geometry;
    a palm-vein; and
    a finger-vein.

6. The system of claim 1, wherein the first and second illumination sources comprise wavelengths in a visible spectral range.

7. The system of claim 1, wherein the first and second illumination sources are comprised of the same wavelength in a visible spectral range.

8. The system of claim 1, wherein the third illumination source is comprised of one or more wavelengths or spectral bands in a near infrared spectral range.

9. A system for obtaining images associated with at least a pair of biometric traits associated with a human body part of a person, from a single acquired image and without contact with the body part of the person, the system comprising:
- a first illumination source configured to provide a first illumination at a first wavelength, and having a first polarization;
- a second illumination source to provide a second illumination at a second wavelength, and having a second polarization;
- a third illumination source configured to provide illumination in a near infrared (NIR) spectrum, and having the second polarization;
- an imaging subsystem including a polarizer having the first polarization and a color sensor system including groups of red, blue and green pixels for capturing a plurality of acquired images, each one of said plurality of acquired images being specific to one of said illumination sources and each said polarization state, as the illumination sources illuminate the body part; and
- a processing subsystem configured to mathematically process, through at least one operation including at least one of mathematical subtraction or division, the plurality of acquired images and use ones of the plurality of acquired images captured by at least two different groups of the pixels to generate at least one new image, the at least one new image providing enhanced contrast of features associated with at least one of a surface biometric trait of the body part and a subsurface biometric trait of the body part.

10. The system of claim 9, wherein:
at least one of the first and second illumination modules produces an optical signal in a blue color region, and the other one of the first and second illumination modules produces an optical signal in a green color region; and
wherein the NIR illumination is within a range of about 600 nm-1000 nm.

11. The system of claim 9, wherein the second illumination source is configured to provide illumination in the NIR spectrum at a wavelength or spectral range that is different to the illumination in the NIR spectrum provided by the third illumination source.

12. The system of claim 11 wherein:
at least one of the second illumination source and the third illumination source produces an optical signal within a range of about 600 nm-800 nm; and
wherein the other one of the second illumination source and the third illumination source produces an optical signal within a range of about 800 nm-1000 nm.

13. The system of claim 9, where the plurality of acquired images is acquired by configuring the color sensor system with a plurality of sensors, with each said sensor being configured to obtain one of the plurality of acquired images.

14. The system of claim 9, wherein the plurality of acquired images is acquired using a single red/green/blue (RGB) color sensor which, simultaneously, obtains separate ones of the plurality of acquired images at different wavelengths associated with the illumination sources.

15. The system of claim 9, wherein the processing subsystem uses at least two different wavelength or spectra range components of image information from the plurality of acquired images to generate a new image, the new image capturing with enhanced contrast features associated with both the surface biometric trait of the body part and the subsurface biometric trait of the body part.

16. The method of claim 9, wherein:
the operation of mathematically generating a new image comprises mathematically subtracting or dividing one of the plurality of acquired images from a different one of the plurality of acquired images, after normalization, to selectively obtain either the surface biometric trait and the subsurface biometric trait; and
wherein the biometric traits comprise a plurality of:
- a palm print;
- a finger print;
- hand geometry;
- a palm-vein; and
- a finger-vein.

17. A method for identifying at least a pair of biometric traits associated with a body part of a person, without contact with the body part of the person, the system comprising:
- using a first illumination source to illuminate the body part with a first illumination at a first wavelength, and a first polarization state;
- using a second illumination source to illuminate the body part with a second illumination at a second wavelength, and specific polarization state;
- using a third illumination source to illuminate the body part with a near infrared (NIR) illumination, and having a second polarization state;
- obtaining a plurality of acquired images, each one of said plurality of acquired images being specific to one of said illumination sources and each said polarization state, as the illumination sources illuminate the body part; and
- using at least two different wavelengths of spectral range components of image information from the acquired images to mathematically generate a new image through at least one of mathematical subtraction or division, the new image capturing with enhanced contrast features associated with at least one of a surface biometric trait of the body part and a subsurface biometric trait of the body part.

18. The method of claim 17, further comprising obtaining the plurality of acquired images using a sensor system having a plurality of sensors, with each one of said plurality of sensors being configured to obtain one of the plurality of acquired images.

19. The method of claim 17, further comprising obtaining the plurality of acquired images using a single sensor which, in sequence, obtains separate ones of the plurality of acquired images at different ones of the wavelengths associated with the illumination sources.

* * * * *